UNITED STATES PATENT OFFICE.

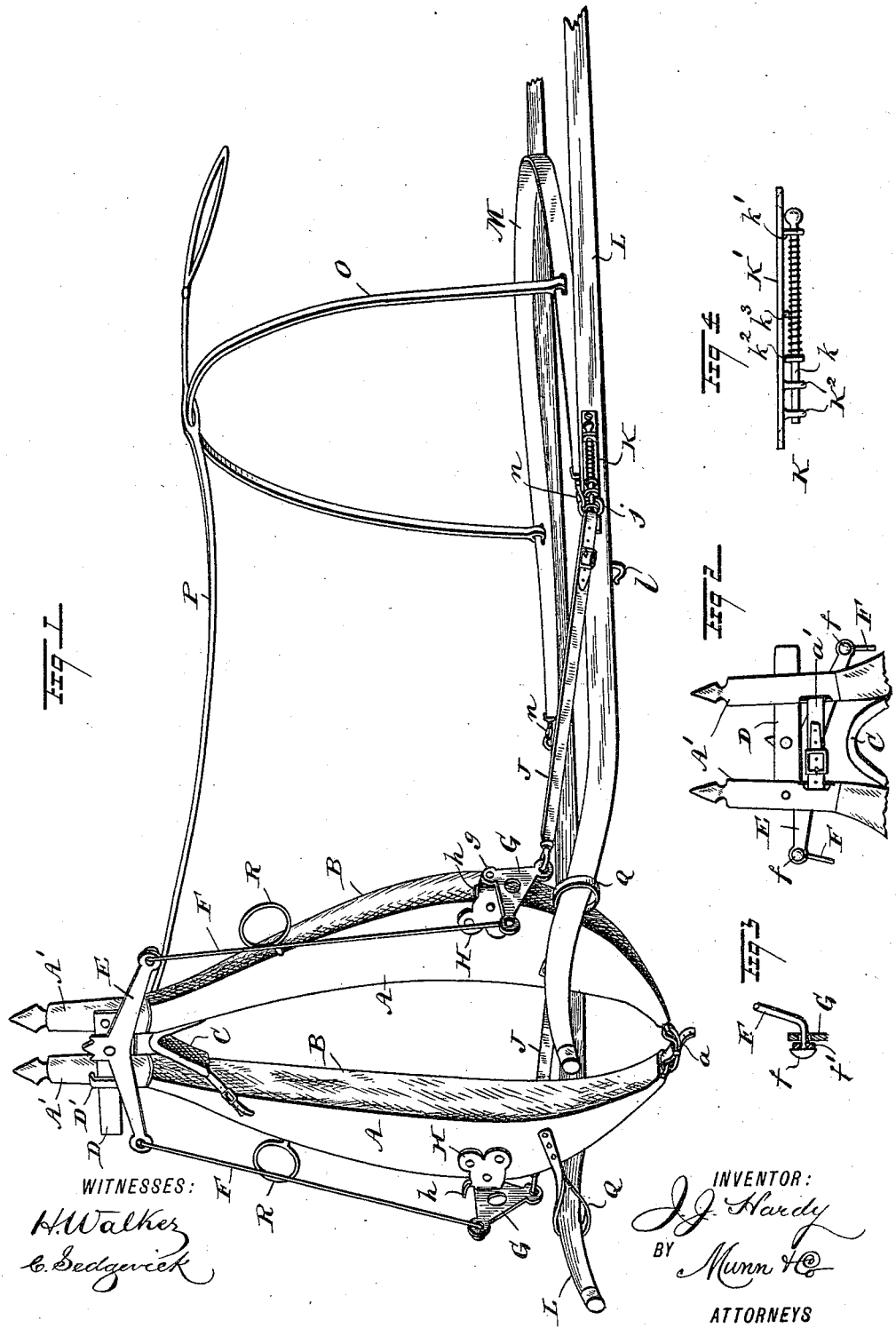

JOHN J. HARDY, OF LAVONIA, GEORGIA.

HARNESS.

SPECIFICATION forming part of Letters Patent No. 455,203, dated June 30, 1891.

Application filed February 12, 1891. Serial No. 381,171. (No model.)

*To all whom it may concern:*

Be it known that I, JOHN J. HARDY, of Lavonia, in the county of Franklin and State of Georgia, have invented a new and Improved Harness, of which the following is a full, clear, and exact description.

My invention relates to improvements in harnesses; and the object of my invention is to produce a harness which is comparatively inexpensive, having only about half the number of parts of an ordinary harness, which may be quickly secured upon a horse, and by means of which the horse may be quickly harnessed or unharnessed in the vehicle, and which will be very easy to the horse and will enable the carriage to be drawn much steadier and easier than when the ordinary harness is used.

To this end my invention consists in certain features of construction and combinations of parts, which will be hereinafter described and claimed.

Reference is to be had to the accompanying drawings, forming a part of this specification, in which similar letters of reference indicate corresponding parts in all the figures.

Figure 1 is a perspective view of a harness embodying my invention and of a pair of shafts broken, showing the manner in which the shafts of a vehicle are attached to the harness. Fig. 2 is a broken rear elevation of the upper part of the collar and the cross-bar pivoted thereon. Fig. 3 is a broken detail sectional view showing the connection between the collar rods and the elbow-levers and cross-bar, and Fig. 4 is a detail plan view of the catch in which the traces are secured.

The harness is provided with a collar to fit the horse's neck, but instead of being like the ordinary collar with which a pair of hames are used, the collar and hames are combined. The collar has on the front sides the plates A, which conform to the general shape of the collar and to which are secured the uprights A' of the hames, which project above the upper part of the collar in the ordinary way, and the back portion of the collar B is stuffed in the usual way to shape it to the horse's neck and to make it easy to wear. The sides of the collar are connected at the bottom and top by hame-straps $a$ and $a'$, respectively, in the usual manner, and the collar has also the usual pad C, which rests upon the horse's neck.

A cross-arm D is secured to one of the uprights A' of the collar, and the cross-arm extends through a keeper D' on the opposite upright, the cross-arm serving as a guide for the opposite sides of the collar and also as a support for the cross-bar E, which is centrally pivoted thereon and the ends of which project beyond the sides of the collar. The cross-arm also enables the collar to be easily fitted to the horse.

The cross-bar is connected at each end by the rods F with the elbow-levers G, which are pivoted at their elbows on the plates H, which are secured to the lower portions of the collar on opposite sides, the said plates H having projecting stops $h$ on their upper edges which engage the elbow-levers when they are raised to an unusual height and prevent the same from being tipped entirely over. The rods F, which connect the elbow-levers and the cross-bar E, have buttons $f$ formed on their ends to prevent them from being drawn through the parts which they connect, and between the buttons and the levers and cross-bar are washers $f'$, which are made of leather or other similar material, the object of the washers being to deaden sound and prevent a rattling of the connected metallic parts.

To the lower ends of the elbow-levers G are connected the short traces J, which are secured to the levers by means of any suitable snaps, and the rear ends of which are buckled into rings $j$, which are held in the catches K, secured to the top of the shaft L. Each catch K comprises a base-plate K', which is secured longitudinally on the shaft, the projecting parallel lugs $K^2$ near the front end of the base-plate, and the spring-pressed bolt $k$, which projects through the lugs $K^2$ and which at its rear end is held to slide in a lug $k'$, the said bolt having a collar $k^2$ thereon, which serves as an abutment for the spring, and which when the bolt is drawn rearward strikes a stop $k^3$ on the base-plate and prevents the bolt from being entirely withdrawn from the rear lug $K^2$. It will thus be seen that the traces may quickly be secured in the catches by simply sliding the bolt and placing the ring $j$ between the lugs $K^2$, and the strain from the traces will come upon the forward lugs. The length of the traces may be adjusted by means of the buckles in the ordinary way.

The harness is provided with the breeching-strap M, which has snap-hooks $n$ at the forward end, which when the horse is harnessed are snapped into the rings $j$ on the traces, although other means of fastening the breeching-straps to the rings may be used, if desired. The breeching-strap is supported by the hip-strap O in the ordinary way, and the hip-strap is connected with the usual back strap P, which instead of being secured to a saddle is buckled to the upper hame-straps in the same way that the back strap is usually secured to the hames of an ordinary double harness. The breeching-strap can be easily secured to the rings $j$, as described, and when the horse is holding back the strain will come upon the rear lugs $K^2$ of the catch K; but, if desired, the breeching-strap may be buckled into the ordinary holdback $l$ on the shafts L in the usual manner. It will be observed that no saddle is used with the harness and the shafts are supported by means of the tug-straps Q, which are secured to the front sides of the collar, and the collar is also provided with terrets R, like the ordinary saddle-terrets, which serve to guide the reins.

By dispensing with the saddle a great saving is effected in the cost of the harness, as the saddle is the most expensive part of the same; but, if desired, a saddle may be used, and in this case the shafts will not need to be inserted in the tug-straps Q.

It will be seen that by the use of my harness the drawing strain comes upon the shafts, and consequently no whiffletree is needed, and by drawing the vehicle in this manner it will run much steadier than when drawn from a single point, as is the case where a whiffletree is used, and in traveling over rough roads the shafts will not strike against the sides of the horse, as they do where a whiffletree is used.

The harness described above has no girths to buckle around the horse, and it may be secured to a horse and carriage in much less time than ordinary harnesses. The harness accommodates itself to the movement of the horse by means of the pivoted cross-bar E and the lever-connections between the cross-bar and the traces, the tilting of the cross-bar and levers being substantially the same as the ordinary oscillating movement of the whiffletree.

Having thus fully described my invention, I claim as new and desire to secure by Letters Patent—

1. As an improved article of manufacture, a harness comprising a combined collar and hames, a cross-bar pivoted on the upper part of the collar, elbow-levers pivoted on the lower sides of the collar, connections between the upper ends of the levers and the cross-bar, traces secured to the lower ends of the elbow-levers, and the ordinary hip and breeching straps connected by a back strap with the upper hame-straps of the collar, substantially as described.

2. A harness comprising a combined collar and hames, the cross-bar pivoted on the upper part of the collar, elbow-levers pivoted on the lower sides of the collar, connections between the elbow-levers and the cross-bar, traces secured to the lower ends of the elbow-levers and provided at their free ends with rings adapted to engage suitable catches on the vehicle-shaft, substantially as described.

3. A harness comprising a combined collar and hames, a cross-bar pivoted on the upper part of the same, elbow-levers pivoted on the lower sides of the collar, connections between the elbow-levers and the cross-bar, traces secured to the elbow-levers, and stops for limiting the upward movement of the elbow-levers, substantially as described.

4. In a harness, the combined collar and hames having a cross-arm at the top secured to one member of the collar and extending through a keeper on the other member, a cross-bar pivoted on the cross-arm, elbow-levers pivoted on the lower sides of the collar, rods connecting the elbow-levers with the cross-bar, and traces secured to the elbow-levers, substantially as described.

5. A harness comprising a combined collar and hames provided with a pivoted cross-bar at the top, pivoted elbow-levers at the lower portion, said cross-bar and elbow-levers being connected by rods, and tug-straps below the elbow-levers, traces connected to the elbow-levers, and hip and breeching straps connected by a back strap to the upper part of the hames and collar, substantially as herein shown and described.

JOHN J. HARDY.

Witnesses:
  G. W. SEWELL,
  THOS. H. KNOX.